United States Patent [19]

Stiles et al.

[11] Patent Number: 5,362,463
[45] Date of Patent: Nov. 8, 1994

[54] PROGRESS FOR REMOVING $NO_x$ FROM COMBUSTION ZONE GASES BY ADSORPTION

[75] Inventors: Alvin B. Stiles, Wilmington, Del.; Charles C. Hong, Upper Arlington, Ohio

[73] Assignee: University of DE, Newark, Del.

[21] Appl. No.: 935,207

[22] Filed: Aug. 26, 1992

[51] Int. Cl.$^5$ .......................................... C01B 21/00
[52] U.S. Cl. ................................. 423/239.1; 423/235
[58] Field of Search .............. 423/239, 239 A, 239.4, 423/235, 239.1, 239.2

[56] References Cited

U.S. PATENT DOCUMENTS

| | | | |
|---|---|---|---|
| 4,258,020 | 3/1981 | Ginger | 423/239 |
| 4,268,488 | 5/1981 | Ginger | 423/239 |
| 4,915,922 | 4/1990 | Filss | 423/239 |
| 5,154,901 | 10/1992 | Yoshida et al. | 423/239 |

Primary Examiner—Gary P. Straub
Attorney, Agent, or Firm—Connolly & Hutz

[57] ABSTRACT

A process for removing NOX from combustion gases by adsorption includes the step of desorbing the NOX when the adsorbent is saturated to create an effluent. The effluent is mixed with a reducing gas and passed over a reduction catalyst which reduces the NOX to water and elemental nitrogen. The resultant harmless gas is discharged to the atmosphere.

16 Claims, 2 Drawing Sheets

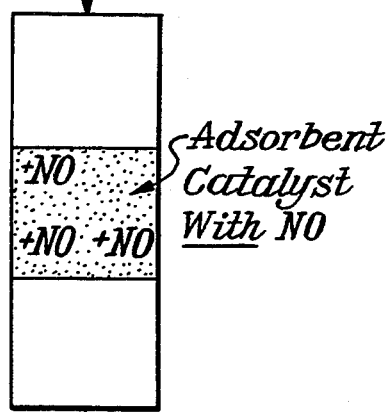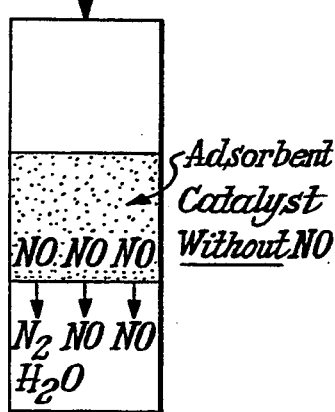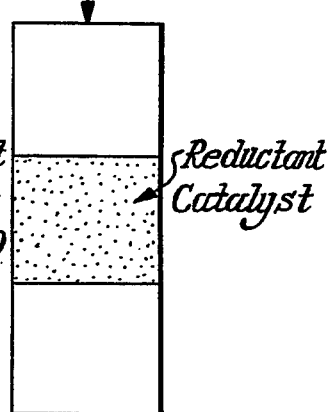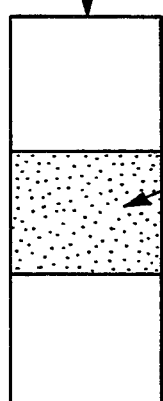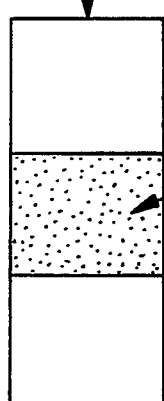

PROGRESS FOR REMOVING NO$_x$ FROM COMBUSTION ZONE GASES BY ADSORPTION

BACKGROUND OF INVENTION

There has been great activity in the field of removing NO$_x$ from combustion zone gases. Much of the work has been done on the removal of SO$_x$ and NO$_x$ from a gas stream derived from coal and residual oil burning furnaces of electric power generating stations. There are many examples of this process stream being purified of the SO$_x$ and NO$_x$, but that is not a part of the present invention. When both SO$_x$ and NO$_x$ are present, many of the schemes handle the SO$_x$ in one reactor and NO$_x$ in a second reactor, after SO$_x$ has been removed. This process and its many variations are not particularly pertinent to the present invention.

U.S. Pat. Nos. 4,182,745 and 4,282,115 are of interest to the present invention. U.S. Pat. No. 4,182,745 issued to Nishida, et al. describes a typical method used for removal of nitrogen oxide by selective conversion by reaction of the nitrogen oxide with ammonia in the presence of oxygen. This process is described and other background information given in column 1, lines 10 through 51.

The uniqueness of the Nishida et al. catalysts is stated also in column 1, lines 53 through 65. The catalysts which are useful in this process are the heteropolyacids and their salts are also identified as being applicable, those are enumerated in column 2, lines 28 through 54.

There are many points of difference between the Nishida et al. process reference (known broadly as the SCR process) and the process of the present invention. First is that the present invention uses no ammonia, whereas, the SCR process uses ammonia as a selective reducing agent. The second point of difference is that the catalyst and adsorbent of the present invention operate at less than 300° C., which is a typical commercially economic condition. The catalyst in question in the SCR process, must operate above 350°, and the single example shows it operating at 400° C., thus entailing a substantial commercial liability for heating the flue gas or heat exchanging after the reduction. In this process the permissible space velocity is 3,000 to 8,000 whereas in the present invention the space velocity is 12,000 to 18,000 making for lower capital costs.

U.S. Pat. No. 4,282,115 issued to Atsukawa, et al. as described in the abstract, uses ammonia as a reducing agent for the reduction of the nitrogen oxides. The novel feature of this patent is that a unique support, calcium silicate, is used and is purported to provide improved resistance to sulfur poisoning. Thus, the thrust of this patent is one of an improved support. Column 3, lines 47 through 67 and column 4, lines 1 through line 66 list prior art.

These SCR cases describe the prior art as it pertains to the use of ammonia as a selective reducing agent for the nitrogen oxide in the presence of oxygen. Other reducing gases such as hydrogen, methane and carbon monoxide are mentioned as not being as selective as ammonia. One of the major problems, however, with the use of ammonia, is the high temperature that is required and the fact that the nitrogen oxide is removed only to the extent of 75 to 95% and not the 100% removal accomplished in the present invention. Furthermore, the ammonia may not be completely reacted with the result that it would, itself be discharged to the atmosphere where it would produce harmful pollution.

A further prior art is a paper which was presented by Shell research of Amsterdam (the Netherlands) as a part of the proceedings of the 1989 joint EPA-EPRI Symposium on stationary combustion NO$_x$ control. This paper discloses that the catalyst is sensitive to sulfur and, as shown on page 2 of the paper, the NO$_x$ conversion is only 60% to 80%. It also is of note that the catalyst is very susceptible to moisture content with the result that moisture tends to deactivate the catalyst. All flue or exhaust gases would contain 10 or more percent of moisture from the inlet air as well as the combustion of the fuel.

The foregoing prior art all are processes which are very closely related to the general process SCR which is the abatement of NO$_x$ using ammonia as the reducing gas. Various prior art show the problems with the process and through it is very different from the present process, are referred to because of the fact that it does remove nitrogen oxide but by a process which is vastly inferior and is substantially different from the process of this invention.

A further prior art of this same process is given in Industrial and Engineering Chemical Research. Issue 29 in the 1990 volume, pg. 1985-1989: This process as described in the introduction on page 1985-1989: This process as described in the introduction on page 1985 is very similar to the two patented processes previously described, except that amorphous chromia is used as catalyst instead of the lanthanum and titanium oxides of the previous references. Furthermore, in this test, there is some very serious doubt thrown on the validity and commercial utility of the data because the gases that are used in the denitrogenation are all anhydrous, whereas any commercial process except in very rare cases, would have water vapor in it.

Other types of nitrogen oxide abatement process will be referred to herein. The first is one entitled "Enhancement Effect of Magnesium Plus Two Ions Under Direct Nitrate Oxide Decomposition Over Supported Palladium Catalyst". This is presented in Applied Calalysis 65, 1990, Letters, pg. 11-Letters page 15. The process is briefly described and superiority is claimed in the introduction on page L11. In describing prior work, certain precious metals catalyst were described but then it was shown that they were not active until temperatures exceeded 500° C. and, preferably, were in the range of 700°-800° C. The superiority of the catalyst presented and described in this reference, which is a magnesium promoted material, is indicated by the fact that it will operate at a temperature in excess of 650° C. The process does not use ammonia, but the conversion of nitrogen oxide and abatement of nitrogen oxide at 550° C. does not exceed 23% and at 650° C. does not exceed 50%. These data are shown in table 1 on page L-13. It is clear that this process is both expensive from the standpoint of temperature requirements and reheat fuel, furthermore is very poor from the standpoint of nitrogen oxide abatement.

A further process, described as the NOXOL process, was briefly described in the "Chemical and Engineering News" in their science technology concentrates, Oct. 21, 1991, pg. 20. In this process, activated alumina granules impregnated with sodium carbonate were used to adsorb both nitrogen oxide and sulfur dioxide. The nitrogen oxide was further processed by desorbing from the adsorbent, and recycling to the furnace to which was added a small amount of methane (natural gas) under which conditions the amount of nitrogen oxide abatement increases from approximately 6% to approximately 90%. This process is under investigation at a commercial installation of the Ohio Power Company at a location which was not identified. The efficacy of this process is not given since the degree to which the nitrogen oxide is removed from the gases by the sodium carbonate alumina adsorbent is not given. The degree to which these nitrogen oxides are regenerated from the sodium carbonate is also not given, but it would be expected that for good removal, very high temperatures would be involved, that is above 600° C. It is not stated, but it would be expected that if the sulfur dioxide is adsorbed by the sodium carbonate, sodium sulfite would be formed which would, in the presence of the oxygen in the gas stream, be converted to sulfate and regeneration would be essentially impossible except at extremely high temperatures, probably above 1,000° C. No report has recently been received of the performance at this commercial site, probably because it is too early to get any indication of performance.

A still further procedure for $NO_r$ abatement is given in "Industrial Engineering Chemistry Product Research and Development" of 1983, 21, pg. 405–408. This process also has serious shortcomings one of which is that the test was made with no oxygen in the gas stream, which, of course, immediately brings into question its capability of removing nitrogen oxides in an atmosphere containing oxygen. Furthermore, temperatures of operation and testing were in the range of 600°–700° C. The information just quoted is given in the introduction to the paper on page 405, whereas the temperature of operation is given in the second column on page 406. Also, at the bottom of this column, the statement is made to have a high conversion when oxygen is present, the temperature must be raised to 750° C. From the standpoint of a practical commercial operation, this is economically unsound.

A still further reference is to a paper in "Industrial Engineering Chemistry Product Research and Development", 1983, line 21 pg 56–59. This process is described in the introduction and comprises a catalyst either nickel oxide or cobalt oxide, supported on activated carbon. The activated carbon was used for the reduction. A description of the process is given briefly in the abstract on page 56 and in the introduction on pages 56 and 57. This process is one in which a catalyst is consumed in the course of the removal of the nitrogen oxide. The $NO_x$ reacts with the carbon forming carbon dioxide, and, simultaneously, the catalyst is being destroyed. It is obviously a very poor solution to the problem and its commercial development has obviously not been achieved since it has been ten years since it was originally proposed in the periodical.

A further reference is given in "Energy and Fuels", 2989, Vol. III, pg 740–743. The title of the paper is "Control of $NO_x$ Emissions by Selective Catalytic Reductions With Hydrogen Over Hydrophobic Catalysts", by L. Fu and K. T. Schuang. The process is described both in the abstract and in the introduction, with the basic concept being that a hydrophobic support, which in this case is di vinyl-benzene-styrene resin, and the catalytic metals, are platinum, platinum plus ruthenium, palladium, ruthenium alone, and gold. The conversion in this process was reported to be 60–80%, but, in the presence of oxygen, this was sharply reduced.

SUMMARY OF THE INVENTION

The present invention relates to a process whereby nitrogen oxides generally identified as $NO_x$ are removed from exhaust gases also containing oxygen, such as those from gas powered turbines and electric power generating stations. These gases contain nitrogen oxide either derived from the fuel or from the extremely high temperatures to which nitrogen and oxygen in the flue gas are simultaneously heated. The $NO_x$, content may be in the range of 50 to 1000 parts per million and the $O_2$ from 0 to 21%.

The process of the invention is unique in that it utilizes an adsorbent comprising primarily manganese oxides, potassium carbonate, potassium permanganate, potassium chromate and dichromate, ceria and alumina which will remove the nitrogen oxides over a long time period by a rapid and compete adsorption process. The adsorbed nitrogen oxides, after a period of adsorption, are removed from the adsorbent by regeneration for reuse of the adsorbent. The adsorbent will remove the nitrogen oxides to the extent of 100% at a space velocity exceeding 15,000 and a temperature in the range of 150°–300° C. or above. The nitrogen oxides can be quickly reduced in situ or be evolved from the adsorbent as a concentrated stream by passing a gas containing $N_2$ plus 0.5 to 10% hydrogen at a temperature of 300° to 350° C. over the saturated adsorbent. The nitrogen oxides in the concentrated stream are reduced to nitrogen and water at this temperature. This reduction of $NO_x$ is also 100% complete over a catalyst comprising, for example, chromium, copper, cobalt or nickel oxides supported on gamma alumina or even the same composition as the adsorbent. The adsorbent can be utilized repeatedly in the adsorption-desorption cycle without loss of effectiveness. Both the catalyst-adsorbent and reducing catalyst are resistant to small quantities of $SO_x$ which may be in the exhaust stream. The process is unique because it can be utilized for adsorption over a period of hours in a gas stream containing oxygen and can readily be regenerated for reuse.

To one skilled in the art it would be evident that desorption of $NO_x$ from the saturated adsorbent could be effected by high temperature steaming or displacement with $CO_2$ or other gas or by evacuating of the $NO_x$ from the adsorbent at pressures lower than that of adsorption.

In recent tests it has been possible to design the catalyst bed and/or the adsorption catalyst and to effect reduction of the $NO_x$ during desorption thus eliminating entirely the catalyst and facilities required for a downstream reduction vessel

THE DRAWINGS

FIGS. 1A–1C are diagrams showing two operations being conducted in a first reactor and the reduction of desorbed $NO_x$ in a second reactor;

FIG. 2 illustrates the details of the reactors of FIG. 1; and

DETAILED DESCRIPTION

Figure 3:
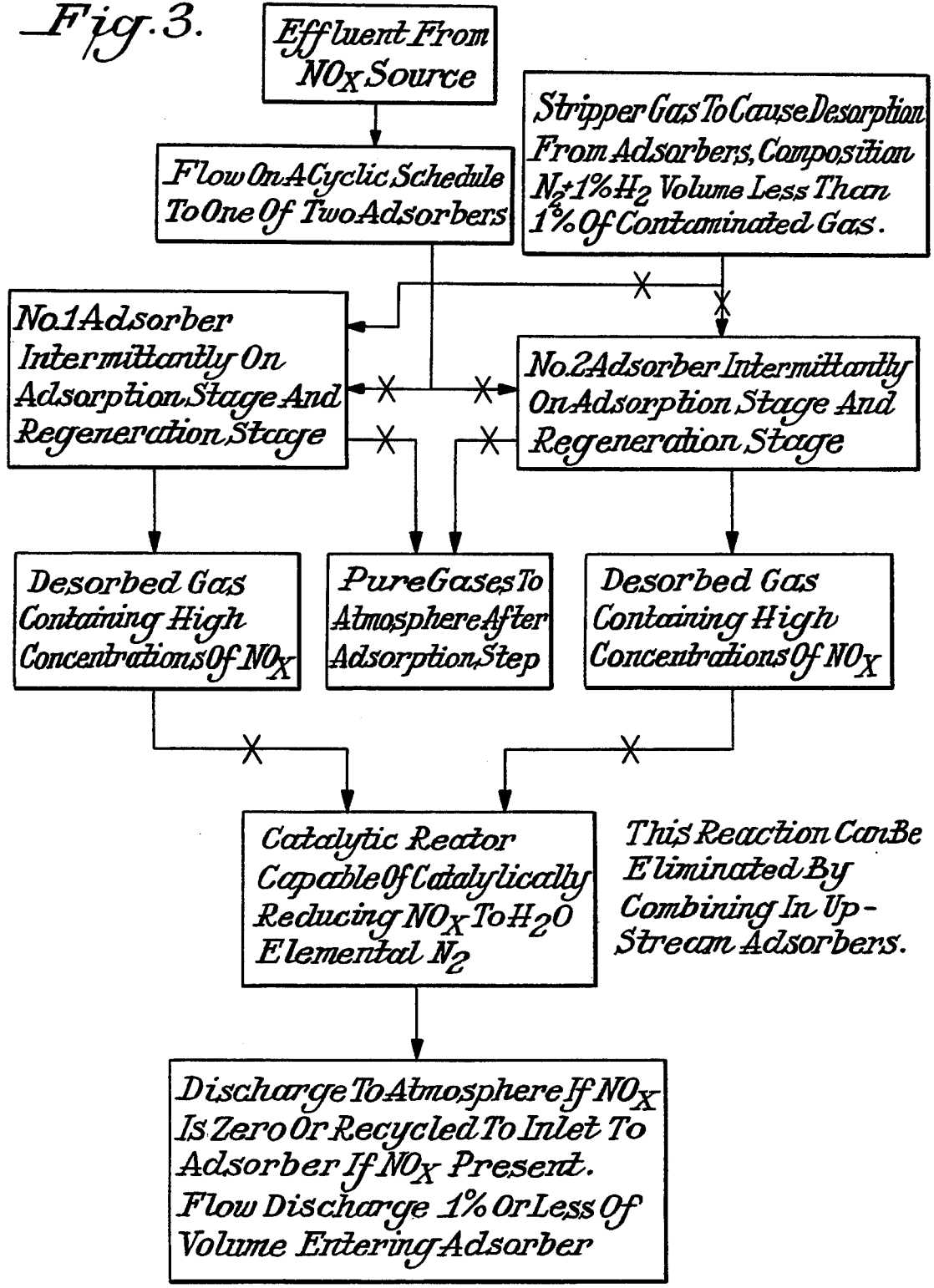
FIG. 3 is a block diagram of the overall practice of the invention in simplified form using the reactors of FIGS. 1–2.

This invention provides a procedure whereby $NO_x$ can be removed from a gas stream containing oxygen to the extent of essentially 100%. The process consists of first adsorbing the nitrogen oxide on a highly efficient adsorbent at approximately 200° C., then desorbing the nitrogen oxide at a slightly higher temperature using a gas stream which contains hydrogen, water vapor and nitrogen, but no oxygen. The nitrogen oxide can be simultaneously desorbed and reduced to nitrogen and water vapor either by the adsorbent itself acting as a reducing catalyst, or by a separate reactor and catalyst type downstream from the adsorbent which reduces the nitrogen oxide to elemental nitrogen and water vapor.

FIGS. 1-2 illustrate reactors which could be used in the practice of this invention. With respect to FIG. 1, instead of using individual reactors, the desorption reactor can be eliminated by placing the reduction catalyst downstream from the adsorbent in the adsorption reactor. In FIG. 2 the designation 1 is the pathway for the adsorption step where the inlet gas is NO, $N_2$, $O_2$, $H_2O$ and the outlet gas is $N_2$, $O_2$, $H_2O$. The designation 2 is the pathway for the desorption-reduction step where the inlet gas is $N_2$, $H_2$ and the outlet gas is $N_2$, $H_2O$. It is noted that there is an $N_2$, $H_2$ addition before the second reactor.

FIG. 3 is a block diagram depicting the complete scheme of $NO_x$ abatement from a large volume of gas containing low concentration of $NO_x$ and also containing $O_2$. The designation X is used to indicate the control valves directing and controlling flow through the system.

Certain of the catalyst-adsorbent materials are resistant to sulfur dioxide, but the catalyst is most efficient in the absence of sulfur dioxide in the gas from which the nitrogen oxides are to be removed. The most effective agent for the adsorption is manganese and aluminum oxide co-precipitated to produce a 50/50 mixture of finely divided mixed manganese and aluminum oxides powder. This powder is milled in a ball mill to produce a paste comprising water, the aluminum oxide-manganese oxide powder and some colloidal cerium oxide to act as strengthening agent for the dried milled paste. After the paste has been dried, the granules are derived by crushing and screening the dried paste. The granules are further treated by adding a solution of potassium carbonate which, on drying, leaves the potassium carbonate completely covering the interior and exterior of the granules.

These granules are placed in the adsorption reactor shown in FIG. 1 which is heated by an external furnace. The gas containing oxygen, nitrogen oxides, water vapor and the remainder nitrogen, is passed through the catalyst in the furnace at approximately 200° C. The exit gas is free of detectable nitrogen oxides and remain so for a period of more than nine hours of testing.

The adsorbent now containing more than 0.2% $NO_x$ by weight is regenerated for reuse by passing a gas containing from .05 to 10% hydrogen in nitrogen; both carbon dioxide and water vapor can also be present. The catalyst and reactor are heated to 300° C. and the aforementioned gas is passed through, simultaneously either reducing the nitrogen oxide in situ on the adsorbent and/or passing it downstream to a different catalyst in the process system. The reduction catalyst can either be in the downstream portion of the same reactor or in a separate downstream reactor, as shown in FIG. 2. Economics favor the single reactor.

After regeneration, the catalyst can be used for adsorption and experience indicates that the amount of nitrogen oxide removed in the second use of the catalyst can exceed the nine hours previously reported for the first use.

Inasmuch as the regeneration scheme requires that the adsorbent catalyst be made available for the regeneration scheme, it is obvious that a second reactor in parallel would be required while the first was being regenerated. The scheme is shown in its entirety in the FIG. 3.

As previously stated, one of the most effective adsorbent catalysts is a 50% manganese oxide 50% aluminum oxide co-precipitated from the nitrate. However, all the ratios of manganese to alumina can be used with good performance being obtained from 20% manganese oxide to 80% of the aluminum oxide, and 80% manganese oxide and 20% aluminum oxide.

Although manganese oxides appear to be relatively unique as being the most effective, adequately effective materials can also be made by substituting for the manganese oxide such oxides as iron, nickel, cobalt, zinc, copper and molybdenum and tungsten, combinations of these oxides plus manganese oxides also are very effective and also have some tolerance to $SO_x$ in the gas stream from which the nitrogen oxides are being removed. In addition to or as a substitute for the alumina one can use silica, thoria, magnesia, calcia, strontia, titania, zirconia, stania or baria or their mixtures or the lanthanides.

Although potassium carbonate is preferred, the alkali carbonate can be that of sodium, rhubidium or cesium. Potassium permanganate, potassium chromate or dichromate or their mixture can also be used and have some advantages. The quantity of alkali can vary from 5 to 50% of the total weight of the adsorbent.

The second stage catalysts that are effective for the reduction of the concentrated nitrogen oxide stream are oxides of nickel, cobalt, iron and tin combined with chromium oxide, gadolinium oxide supported on alumina, silica, titania, ceria, zirconia and others. Many other hydrogenation catalysts are effective including the precious metals and the moderated precious metals.

Although the temperature of adsorption is described above as approximately 200° the temperature can be varied from approximately 100° to 500°. The reduction can be conducted at 200° to as high as 500°. Problems may be encountered when the adsorption is at too low or too high a temperature, and also the reduction of the nitrogen oxide may be adversely influenced (may form a small amount of $NH_3$) if the reduction is conducted at temperatures in excess of 350° C.

Instead of or in addition to the use of a second (reduction) reactor one can recycle the effluent from the reducer or the adsorber itself, and small quantities of $NO_x$ to the high temperature combustion zone or the incoming flue gas to the adsorber for elimination by either of these three means.

The present invention, differs importantly from the SCR process in that no ammonia is used in the reduction of the $NO_x$. Ammonia is objectionable because it may in itself produce nitrogen oxides or it may be incompletely reacted in the course of the nitrogen oxide abatement, and, as a consequence, produce adverse atmospheric affects. Further points of difference are that the adsorbent-catalyst has a uniquely high capacity, in that it will function for long periods of time experimentally determined to be over nine hours. The regeneration of this catalyst can be accomplished in as short a time as twenty minutes, by choosing the proper gas type and temperature conditions. This makes it possible for the process to be operated on a cycling basis, with high efficiency of $NO_x$ adsorption, and high efficiency of reduction of the nitrogen oxide so the gas streams involved can, after adsorption and also after reduction, be exhausted to the atmosphere as pure gases.

A third point of difference is that the temperatures employed are all either relatively low or a very small volume of gas is heated to the 350°–500° C. range. This is in contrast to the aforementioned background processes at which the gas may be heated as high as 800° C., and in huge volume. Always, in the background processes, the heating or secondary heat recovery is performed on the entire gas stream, whereas in this invention, it is a small stream used for the regeneration process. This gas stream may be from 1–3% of the volume of the gas from which the nitrogen oxide is removed.

The temperature used for the adsorption in the present invention, 200° C., is very close to if not equal to the temperature at which the gas would be exhausted from a boiler or compressor. This means that it would be unnecessary to heat or reheat large volume of gas because the low temperature of adsorption is essentially identical to that of the flue gas exhaust. As for the reduction gas, as pointed out previously, this is of such low volume that the cost of heating it to the 300°–400° C. desired is economically of little concern.

EXAMPLES

The following examples demonstrate the procedure for manufacturing first the adsorbent, second the reduction catalyst for reducing the nitrogen oxide and last the testing procedure whereby the catalyst and adsorbents were evaluated. The extent of the examples is such that they demonstrate the procedures and materials used, but it should in no way limit the extent to which this concept can be extended. Example 1 is as follows:

The Adsorbent

1. An aqueous solution is made consisting of 1 ltr. of distilled water and 0.5 mole of manganese nitrate, anhydrous, and 0.5. mole aluminum nitrate nonahydrate.
2. The solution is adjusted to a temperature of 30° C. and is rapidly, agitated with a paddle type agitator.
3. With the agitator operating, a 10% solution of potassium carbonate is added until a pH of 6.8–7.0 is attained.
4. With carbon dioxide constantly bubbling through the slurry, the slurry is agitated at 30° C. for a period of 1 hour after the correct pH is attained.
5. After this period of supplemental carbon dioxide addition, the slurry is filtered and separated from the supernatant liquid.
6. The filter cake is dried at 150° C. and then is calcined for 2 hours at 400° after the temperature reaches 400° C.
7. The powder is ball milled for 18 hours with sufficient water to make a thin slurry.
8. The slurry is removed from and washed out of the ball mill into a large beaker and is washed by decantation using a solution of 0.10% of ammonium bicarbonate. The purpose of which is to ion exchange out the alkali ion and replace it with ammonium ion. The ammonium ion is volatilized and removed from the adsorbent during subsequent heating.
9. After the washing by decantation and removal of the potassium to less than 0.10%, the slurry is filtered and washed on the filter.
10. The washed filter cake is dried at 150° C.
11. The washed and dried cake is next ball milled with sufficient water to produce a relatively thin slurry in which is included sufficient colloidal cerium oxide to result in a 3% content in the dried milled paste. The milled paste is dried at 150° C.
12. After drying, the cake is crushed and granulated to produce a screen size distribution preferred in the subsequent test. This range is usually 8 to 14 mesh.
13. The granules are now impregnated with a solution of $K_2CO_3$ in such volume and concentration to give $K_2CO_3$ content of 50% of the total weight of the dry adsorbent Instead of 50% the percentage can be varied from 10 to 90% but the 50% content has proved to be optimum. Instead of $K_2CO_3$, $Na_2CO_3$, $Rb_2CO_3$ or $Cs_2CO_3$ can be used or the bicarbonates of the alkali metals.
14. The adsorbent is now dried and after drying is ready for use.

Description of the Preparation of the Reduction Catalyst

The reduction catalyst is made by the following procedure:

1. A solution is made containing 0.5 mole of nickel nitrate hexahydrate and 0.5 mole of chromium nitrate. Sufficient distilled water is used in this step to produce a total of a one molar solution.
2. The solution is heated to 30° C. and a concentrated solution of ammonium bicarbonate is added to reach a pH of 6.8 to 7.0.
3. At the completion of precipitation, the slurry is agitated for an additional one hour, during which time carbon dioxide in finely divided bubbles, is bubbled through the slurry to attain a high carbonate level in the precipitate.
4. The slurry is filtered and washed then the filter cake is dried at 150° C.
5. After drying, the reduction catalyst is calcined at 400° C. for two hours after reaching 400°. After performing 5, the procedure becomes the same as items 6 through 12 of the instructions for the adsorbent in the initial part of this example.

The next section of this example 1 is evaluating the adsorbent and the reduction catalyst as subsequently described.

Evaluation of the Adsorbent and Reduction Catalyst

1. Two reactors are set up in sequence, with the first reactor and the second reactor being essentially identical in all respects. The reactors in question comprise a quartz tube ⅞″ in diameter by 24″ long, which is placed in a split furnace, enabling the heating of the reactor to a chosen temperature from 100° C. to 500° or greater, as is required for the test in question. The reactors are each equipped with a means of introducing gas at the top of the reactor and removing the gas at the bottom of the reactor. Thermocouples are placed in such locations that the temperature of the furnace and the interior of the catalysts bed and the upstream portion just above the catalyst bed, can be determined and controlled. The gases entering the reactors are heated and controlled by suitable control equipment.

The evaluations are conducted as follows in the previously described equipment:

1. The adsorbent is placed in the first reactor and is situated in such a way that a vertical column of the adsorbent, at least 3 reactor diameters high, (Ca. 3 inches) is present in the reactor with the thermocouples in locations where temperature can be indicated and controlled. The reactor is heated to 180° C. and a gas flow, comprising 400 parts per million of nitrogen oxide, 3% oxygen 12%–15% water vapor and the remainder nitrogen, is passed over the catalyst at a space velocity of from 3,000 to 20,000. At this temperature and at this flow, the gas is measured exiting the unit and an analysis indicated zero parts per million of $NO_x$ in the gas exit stream.
2. Flow is continued for a total of nine hours and, during this period, analyses are made on twenty minute intervals until the end of the nine hour period. During this period, removal of $NO_x$ is 100% complete.
3. At this point, the nitrogen oxide on the adsorbent must be removed in order to prepare it for further use as an adsorbent. To accomplish this, a gas stream comprising nitrogen, 0.5 to 5% hydrogen and 8–12% water vapor is passed over the catalyst at a space velocity of 3,000–12,000 and at a temperature of 300°–325° C.
4. A temperature rise of approximately 50° C. is noted in the catalyst bed as the nitrogen oxide is removed and simultaneously reduced.
5. Reduction is continued for two hours during which time the nitrogen oxide being desorbed totals approximately 22% of that which had been originally adsorbed, with the remainder, which is not amenable to analysis, being converted to elemental nitrogen and water vapor before or during desorption in the $H_2$ containing gas stream.
6. At the conclusion of two hours, the adsorbent has been regenerated for reuse.
7. While the adsorbent is being regenerated, the nitrogen oxide which is contained in the effluent, is passed through the second reactor at a temperature of 300°–325° C. In this reactor, 100% of the nitrogen oxide remaining is converted to water vapor and nitrogen.
8. The temperature in the adsorbent portion of the two reactors can be changed from as low as 100° C. to as high as 500° C., the optimum being approximately 180°–200° C. but is dependent on space velocity. Furthermore, the temperature in the reducing vessel can be changed to 250°–500° C. with the optimum being approximately 300° C. Further, the two reactors can be combined in such a way that the adsorbent is in the top stage of a single reactor, and the reductant catalyst in the bottom stage of the same reactor, and the temperature can be varied to accomplish both the adsorption stage at 200° C. and the reduction stage at a higher temperature. If the temperature at this point is raised to approximately 325° C., the adsorbent will perform two desirable things, one of which is the adsorbed nitrogen oxide can be removed totally in about twenty minutes and approximately 80% of the nitrogen oxide is reduced to water vapor and elemental nitrogen during this desorption stage. The decision as to whether two reactors should be used versus one, is dependent upon the conditions of an individual system, which decisions are made on the basis of economics and industrial/commercial factors.

After the regeneration, the adsorbent was again used and was examined for adsorption characteristics and these proved to be at least as effective as the initial test. The adsorbent and reduction catalyst were used, reused and regenerated for a total of 12 cycles with little to no deterioration in performance.

Instead of the manganese alumina mixture used in the adsorption, many other types can be used as discussed and shown in the subsequent examples. The same variation in composition can be made in the reducing portion of the catalyst beds with the result that a large number of candidates are suitable for this service. Many of these will be identified in the abbreviated examples presented in Table 1.

TABLE 1

Abbreviated Presentation of Examples 2 through 17

| Abreviated Example Number | Composition | Ingredient Atomic Ratio | Precipitant | Hardening Agent | $NO_x$ Removed % | Time Hours |
|---|---|---|---|---|---|---|
| 2 | $MnO_x/Al_2O_3$ | 50/50 | $K_2CO_3$ | 3% $C_eO_2$ Colloidal | 99 | 6 |
| 3 | $MnO_x/Al_2O_3$ | 50/50 | $K_2CO_3$ | 3% $C_eO_2$ | 100 | 4 |
| 4 | $MnO_xAl_2O_3$ | 50/50 | $K_2CO_3$ | 3% $C_eO_2$ | 100 | 3 |
| 5 | $BaOAl_2O_3$ | 50/50 | $K_2CO_3$ | 3% $C_eO_2$ | 25–50% | 2.5 |
| 6 | $CaOAl_2O_3$ | 50/50 | $K_2CO_3$ | 3% $C_eO_2$ | 5–40% | 2 |
| 7 | $MgOAl_2O_3$ | 50/50 | $K_2CO_3$ | 3% $C_eO_2$ | 25–40% | 2 |
| 8 | $MnO_xCaOAl_2O_3$ | 25/25/50 | $K_2CO_3$ | 3% $C_eO_2$ | 78–93% | 4.5 |
| 9 | $MnO_xMgOAl_2O_3$ | 25/25/50 | $K_2CO_3$ | 3% $C_eO_2$ | 62–99% | 6 + 6 |
| 10 | Same as Test 9 | | | | 92–100 | 7 |
| 11 | $MnO_xMgOAl_2O_3$ | 25/25/50 | $K_2CO_3$ | 3% $C_eO_2$ | 80–96% | 6.5 |
| 12 | $MnO_xSiOAl_2O_3$ | 50/25/25 | $K_2CO_3$ | 3% $C_eO_2$ | 50–80% | 3.5 |
| 13 | $MnO_xMgOAl_2O_3$ | 50/25/25 | $K_2CO_3$ | 3% $C_eO_2$ | 70–90% | 3.5 |
| 14 | $MnO_xZrOAl_2O_3$ | 25/25/50 | $K_2CO_3$ | 3% $C_eO_2$ | 70–96% | 6.5 |
| 15 | $NiOAl_2O_3$ | 50/50 | $K_2CO_3$ | 5% colloidal $SiO_2$ | 100% | 5.5 |
| 16 | $NiOAl_2O_3$ | 32/18/50 | $K_2CO_3$ | 5% $SiO_2$ | 100% | 4.0 |
| 17 | Commercial $MnO_x$ | 100% $MnO_x$ | — | None Necessary | 99% | 1.0 |
| 18 | See below, following Note 2. | | | | | |

| Abreviated Example Number | Adsorpiton Temperature | Time Hours | Regeneration Temperature | $NO_x$ Reduced During Regeneration | Promoter Alkali |
|---|---|---|---|---|---|

TABLE 1-continued

Abbreviated Presentation of Examples 2 through 17

| | | | | | |
|---|---|---|---|---|---|
| 2 | 195–210 | 2 | 205–305 | 56% | $K_2CO_3$ |
| 3 | 180–225 | 2 | 205–330 | 75% | $K_2CO_3$ |
| 4 | 170–206 | 2 | 293–312 | 75% | $K_2CO_3$ |
| 5 | 185–229 | None | | | None |
| 6 | 191–227 | None | | | None |
| 7 | 191–227 | None | | | None |
| 8 | 191–215 | None | | | None |
| 9 | 195–210 | 3 hours | 310–340 | 70% | $K_2CO_3$ |
| 10 | 197–211 | 3 hours | 310–350 | 75% | $K_2CO_3$ |
| 11 | 198–276 | 3 hours | 310–345 | 29% | $K_2CO_3$ |
| 12 | 205–265 | | | | |
| 13 | 178–268 | | | | |
| 14 | 181–250 | | | | |
| 15 | 250 C. | 1.5 | 400°–500° C. | Not determined | $K_2CO_3$ |
| 16 | 300° C. | 0.16 | 400° C. | Not determined | $K_2CO_3$ |
| 17 | 250° C. | 2.0 | 300° C. | Not determined | $K_2CO_3$ |
| 18 | | | | | |

Note 1 to first 17 Examples

The foregoing 17 examples portray individual tests of most significance but many other tests were made to determine the optimum $CeO_2$ content as hardener (range 1 to 15%), $MnO_x/Al_2O_3$ ratio (10/90 to 90/10) and the preferred alkali, both type and quantity, (50% $K_2CO_3$); $Na_2CO_3$, $Cs_2CO_3$, and $Rb_2CO_3$ were compared to $K_2CO_3$. A range of 10 to 75% on the basis of total weight of the catalyst were evaluated and 50% of $K_2CO_3$ was preferred. The preferred precipitant was $KHCO_3$.

Note 2

Although elements as oxides other than $MnO_x$ were evaluated, the best adsorbent was either all $MnO_x$ and alumina or a composition in which $MnO_x$ was still a significant component.

Example 18

This example is a summary of fabrication procedures and component identification for useful $NO_x$ reduction catalysts. These catalysts are to be used in that portion of the abatement system represented by the next to the last block of the block diagram of FIG. 3. As explained herein before, if the two reactors are combined into a single reactor this reduction catalyst would be in the down-stream portion of that reactor. Thus the reduction catalyst, e.g. $NO_x + H_2 > H_2O + N_2$ and its possible components are much broader than for the catalyst adsorbent. Examples of the preferred reduction catalyst are given in Example 1 and are comprised of copper oxide and chromia or probably some copper chromite. This catalyst is preferred because it has little if any, tendency for the formation of $NH_3$. However, with proper selection of operating conditions, temperatures, space velocity, reducing gas composition and catalyst calcining condition, many other elements can be substituted for both the copper and chromium. As examples but not limited to are Al, Fe, Ti, Zr and Sn. These ingredients as soluble salts, preferably nitrates, are processed as described in Example 1 to produce a granular product. The ingredients can also be impregnated onto and into a support such as alumina, silica, silica alumina, activated carbon, silicon carbide, and others well known to the art. The form of the supports can be granules, cylinders, rings, honey combs, rods, spheres and others also known to the art. These same forms are suitable also for the adsorbent.

What is claimed is:

1. A process for removing $NO_x$ from combustion product gases by adsorption including the steps of feeding the $NO_x$ in a feed gas stream devoid of ammonia to a catalyst-adsorbent at a temperature in the range of 100° C. to 500° C., the catalyst-adsorbent including a mixture of manganese oxide and aluminum oxide wherein the mixture contains from 80% to 20% manganese oxide and from 20% to 80% aluminum oxide, the catalyst-adsorbent being treated with an alkali metal promotor and with a rare earth hardener, desorbing the $NO_x$ when the catalyst-adsorbent is substantially saturated, stopping the flow of $NO_x$-containing gases, substituting therefore a mixture of $N_2$ and $H_2$, increasing the temperature of the catalyst-adsorbent and environment and desorbing the $NO_x$ and simultaneously reducing a large volume of that $NO_2$ to $N_2$ and water, such $NO_x$ and $H_2$, $N_2$ mixture also containing water vapors and nitrogen but no oxygen, creating a mixture from the desorption effluent and a reducing gas, and passing the mixture over a reduction catalyst to reduce the $NO_x$ to water and elemental nitrogen, and discharging the resultant harmless gas to the atmosphere.

2. The process of claim 1 wherein the combustion zone gas is used for a boiler or other heat utilizing requirement and is then discharged as a flue gas to become a feed gas for later processing.

3. The process claim 1 wherein the desorbing step is performed at a temperature in the range of 200° C. to 500 ° C.

4. The process of claim 3 wherein the $NO_x$ is absorbed at a temperature of about 200° C.

5. The process of claim 1 wherein the $NO_x$ is desorbed and subsequently reduced in a separate reactor and catalyst downstream from the catalyst adsorbent.

6. The process of claim 1 wherein the manganese oxide and the aluminum oxide are co-precipitated from the nitrate to produce a mixture of finely divided powder, milling the powder to produce a paste containing water and the powder and a strengthening agent, drying the paste, producing granules by crushing and screening the dried paste, and covering the granules with a carbonate.

7. The process of claim 1 wherein the catalyst adsorbent is usable and regenerable and reusable.

8. A process for removing $NO_x$ from a gas containing $NO_x$ as an impurity and oxygen as an additional component, including the steps of passing the gas over an adsorbent comprising an intimate mixture of a high area refractory and a metallic oxide and an alkali carbonate or potassium permanganate, potassium chromate or dischromate, the metal oxide being selected from the group consisting of oxides of manganese, iron, nickel, cobalt, zinc, copper, molybdenum and tungsten and mixtures thereof, the refractory being selected from the group consisting of oxides of alumina, silica, thoria, mangesia, calcia, strontia, titania, zirconia, stania, baria and mixtures thereof or the lanthanides, the alkali carbonate being selected from the group consisting of carbonates of potassium, sodium, rubidium and cesium, the alkali content being from 5% to 50% of the total weight of the adsorbent, and the adsorbent removing the $NO_x$ from the gas without removing the oxygen.

9. The process of claim 8 the adsorbent removal functions to the extent that its weight is increased by at least 0.2% because of the $NO_x$ adsorbed.

10. The process of claim 9 wherein the adsorbent removal functions for at least about 6 hours at a space velocity of 3000 and a temperature of 200° C. with 400 ppm of $NO_x$ in the inlet gas and less than 10 ppm of $NO_x$ in the exit gas.

11. The process of claim 8 wherein after the gas containing $NO_x$ is no longer fed to the adsorbent, the inlet gas to the adsorbent is altered to a nitrogen containing hydrogen gas and the temperature is increased, and reducing the adsorbed $NO_x$ in situ to $N_2$ and $H_2O$ and some desorbed $NO_x$.

12. The process to claim 11 including recycling the effluent from the reduction and desorption step back to the source of the $NO_x$ and oxygen containing gas for combustion of any residual combustible gases and decomposition of any $NO_x$ in excess of equilibrium conditions.

13. The process of claim 8 wherein the gas is flue gas.

14. The process of claim 8 wherein the gas is a compressor or turbine discharge gas.

15. The process of claim 8 including flowing the effluent from the $NO_x$ source gas on a cyclic schedule to one or two adsorbers after a period of time stopping the $NO_x$ containing gas flow and then conducting a stripper gas containing a reducing gas to the adsorbers where the $NO_x$ adsorbed is simultaneously desorbed and reduced to $H_2O$ and elemental $N_2$.

16. The process of claim 15 including flowing the desorbed gas to a secondary catalyst bed or a catalytic reactor which reduces any residual $NO_x$ to $H_2O$ and $N_2$ and then discharging the effluent to the atmosphere.

* * * * *